United States Patent [19]
Geiersbach et al.

[11] 3,849,719
[45] Nov. 19, 1974

[54] POWER RECTIFIER HAVING PHASE CONTROL ANGLE OF FIRING SIGNALS INDEPENDENT OF SUPPLY FREQUENCY VARIATION

[75] Inventors: Allois F. Geiersbach, Milwaukee; Thomas P. Gilmore, Wauwatosa, both of Wis.

[73] Assignee: Allis-Chalmers Corporation, Milwaukee, Wis.

[22] Filed: Dec. 14, 1973

[21] Appl. No.: 425,177

[52] U.S. Cl. ............... 321/69 R, 318/171, 318/231
[51] Int. Cl. ........................................... H02m 5/30
[58] Field of Search ........ 321/7, 66, 69 R; 318/171, 318/231

[56] References Cited
UNITED STATES PATENTS

| | | | |
|---|---|---|---|
| 3,686,558 | 8/1972 | Havas | 321/69 R |
| 3,689,813 | 9/1972 | Sawyer | 318/231 X |
| 3,819,992 | 6/1974 | Opal | 318/171 |

*Primary Examiner*—R. N. Envall, Jr.
*Attorney, Agent, or Firm*—Lee H. Kaiser

[57] ABSTRACT

A sample of the supply voltage for a power rectifier with phase control is passed through a filter which shifts it through a substantially constant phase angle of approximately $n$ times 90°, where $n$ is an integer, and may change its amplitude over a wide range with variation in supply voltage frequency. The reference signal, which is compared to the phase-shifted sample voltage to derive the rectifier firing signals, is varied in proportion to the amplitude of the filter output voltage. Inasmuch as the phase shift is constant and the ratio of filter output voltage to reference signal is also constant, the firing angles of the rectifier firing pulses are independent of supply voltage frequency and amplitude variations.

14 Claims, 8 Drawing Figures

POWER RECTIFIER HAVING PHASE CONTROL ANGLE OF FIRING SIGNALS INDEPENDENT OF SUPPLY FREQUENCY VARIATION

This invention relates to power rectifiers using phase control such as cycloconverters and in particular to such power rectifiers whose power supply may be subject to variation in frequency and amplitude.

BACKGROUND OF THE INVENTION

It is known to regulate the average voltage supplied from an alternating current power source such as a generator through a power rectifier to a load by phase control of the angle of retard of the rectifier firing signals. In such phase control a sample of the sinusoidal power supply voltage may be compared with a reference signal representing the desired load voltage in order to derive firing signals for the controlled rectifiers. The firing angles (phase-control angles of retard) of the controlled rectifiers vary with the relative phase and amplitude positions of the reference and generator sample voltages and control the duty cycle of the SCR's and thus regulate the load voltage. The supply voltage is typically a sinusoidal voltage containing varying degrees of electrical noise, and the variations in supply voltage frequency and amplitude introduce errors in the SCR firing angles and thus in the voltage supplied to the load. It is known to compensate for variations in the supply voltage frequency and magnitude by regulating the amplitude and reproducing the fundamental of the sinusoidal sample generator waves in a filter designed to have constant output amplitude and constant phase over the operating frequency range, but such compensation requires a costly and complicated filter and a costly amplitude regulator and severely limits the allowable input frequency range to the filter, typically a ±5 percent variation.

OBJECTS OF THE INVENTION

It is an object of the invention to provide an improved firing signal deriving circuit for a power rectifier using phase control wherein the phase-control angles of retard of the firing pulses are independent of variations in supply voltage frequency and amplitude over a very wide range.

It is a further object of the invention to provide an improved circuit for generating firing signals for a loadsupplying controlled rectifier with phase control which permits wide supply generator frequency shift and amplitude variation without causing error in the firing angles. Another object is to provide such an improved SCR firing signal deriving circuit which does not need an amplitude regulator or a costly and complicated filter designed to have constant output amplitude and constant phase over the operating frequency range as required in prior art apparatus.

DESCRIPTION OF THE DRAWING

These and other objects and advantages of the invention will be more readily apparent from the following detailed description when considered in conjunction with the accompanying drawing wherein:

FIG. 2 is a schematic circuit diagram of a single phase embodiment of the invention with circuit elements shown within blocks identified by the same reference figures as FIG. 1;

SUMMARY OF THE INVENTION

A sample of the supply voltage for a power rectifier with phase control embodying the invention is passed through a filter which shifts it through a substantially constant phase angle of approximately $n$ times 90°, where $n$ is an integer, and may change its amplitude over a wide range with variation in supply frequency. The reference signal is varied in proportion to the amplitude of the phase-shifted sample voltage output from the filter. The phase-shifted sample voltage is compared to the modified reference signal to derive firing pulses for the rectifier. Since the phase shift is constant and the ratio of filter output voltage to reference voltage is also constant, the phase control angles of the firing signals for the rectifier are independent of supply voltage frequency and amplitude variations.

DETAILED DESCRIPTION

Figure 1:
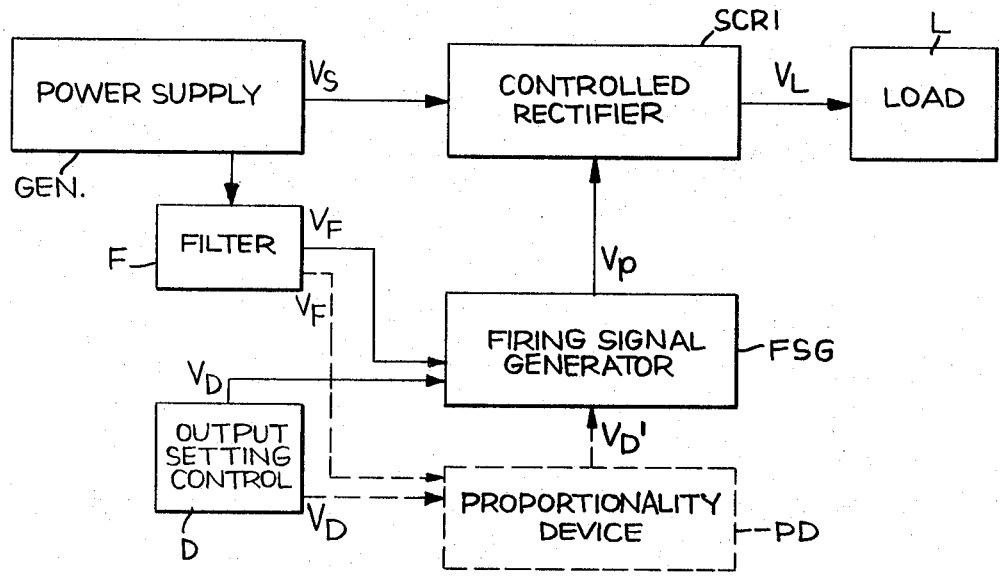
FIG. 1 is a block diagram of a power rectifier with phase control representing known structure in solid blocks and lines and a preferred embodiment of the invention in dotted blocks and lines.
Figures 2A, 2B, 2C:
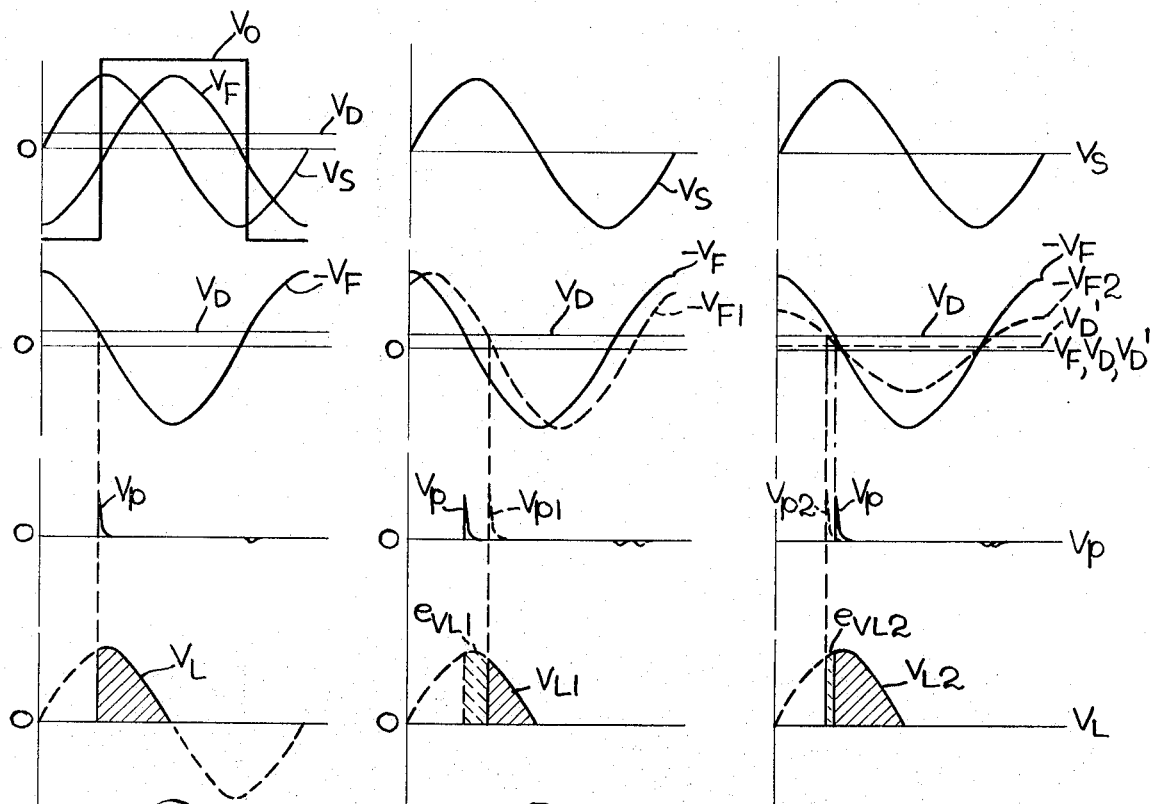
FIG. 2a illustrates the normal supply and reference voltages $V_S$ and $V_D$ respectively, the SCR firing pulses $V_P$, and the load voltage $V_L$ in a known power rectifier with phase control.
FIG. 2b illustrates how phase shift introduced by the filter results in error in load voltage.
FIG. 2c illustrates how the amplitude transfer function of the filter results in load voltage error.

Referring to the drawing, FIG. 1 is a schematic block diagram of a power rectifier circuit with phase control showing known elements in full blocks and lines and an embodiment of the invention in dashed blocks and lines. A typical power rectifier with phase control is polyphase, but the invention will be described with reference to a single phase circuit to simplify the disclosure and facilitate understanding of the invention. A supply voltage source GEN such as an alternating current generator supplies a load L with a variable voltage $V_S$ of frequency $f$ through a controlled rectifier SCR1 using phase control to regulate the average voltage $V_L$ supplied to the load L. Supply generator sinusoidal voltage $V_S$ may have varying degrees of electrical noise mixed with it and may vary in both frequency and amplitude. The average voltage $V_L$ supplied to the load L may be controlled by firing SCR1 with spike firing pulses $V_P$ (see FIG. 2) from firing signal generator FSG having selectively variable firing angles which regulate the duty cycle of SCR1, i.e., the portion of each positive half cycle of supply voltage $V_S$ during which SCR1 conducts as shown by the shaded area of the load voltage waveform $V_L$ in FIG. 2a. The phase position (phase-control angle of retard, or firing angle) of the firing pulses $V_P$ relative to sinusoidal generator voltage $V_S$ determines the point during the positive half cycle of generator voltage $V_S$ that SCR1 begins to conduct and thus controls the average voltage $V_L$ supplied to the load L. FIGS. 2a, 2b and 2c illustrate that controlled rectifier SCR1 conducts for varying periods of time with different phase positions (firing angles) of firing pulses $V_P$ relative to power supply voltage $V_S$ and thus changes the average voltage $V_L$ supplied to the load L.

Controlled rectifier SCR1 energizes the load L with a portion of each positive half cycle of supply voltage $V_S$. The phase position of the firing pulses $V_P$ relative to the power supply voltage $V_S$ determines when SCR1 turns on and thus regulates the duty cycle and the average voltage supplied to the load. In known power rectifiers with phase control a sample of the power supply voltage $V_S$ is passed through a filter F which may remove noise, such as ripple and notches, and may restore the fundamental of the generator voltage. Such a conventional noise and ripple removing filter introduces phase and voltage variations in the filter output voltage $V_F$ with changes in supply voltage frequency. A single pole filter F such as that formed by resistance R1 and capacitor C1 in FIG. 3 has an amplitude transfer function:

$$V_F/V_S = 1/\sqrt{1 + (\omega R_1 C_1)^2}$$

where $\omega = 2\rho f$. The phase shift between $V_F$ and $V_S$ introduced by such filter is $$\text{phase} = -\tan^{-1}\omega R_1 C_1$$

Conventional controlled rectifier apparatus with phase control, particularly apparatus fed from a 60 Hertz power main where frequency is essentially constant, uses a filter with as small a degree of filtering as feasible to minimize the effect of change in $\omega$ and thus keep the phase shift close to zero and the amplitude transfer function $V_F/V_S$ constant or uses a more elaborate filter where a large degree of filtering is necessary. As the frequency of the power supply becomes subject to greater variation, the notch and ripple removing filter, as well as the electronic circuit to compensate for phase and amplitude variations introduced by the filter, becomes more and more complex. This is particularly true in a system having its own voltage supply generator driven by a variable speed prime motor, and if the supply frequency variation is wide, filter compensation becomes prohibitively expensive, particularly where it requires an amplitude regulator and means to reproduce the fundamental of the supply voltage. Furthermore, such a system severely limits the allowable input frequency range to the filter, typically to ±5 percent variation. U.S. Pat. No. 3,584,276 to Ringland et al, which has the same assignee as this invention and in which we are joint patentees with others, discloses a cycloconverter circuit wherein a filter removes notches and noise in the sample generator voltages, restores the fundamental of the sample generator voltages, and mixes the sample generator voltages with a reference signal to regulate the derivation of firing pulses for the SCR's of the cycloconverter.

Figure 3:
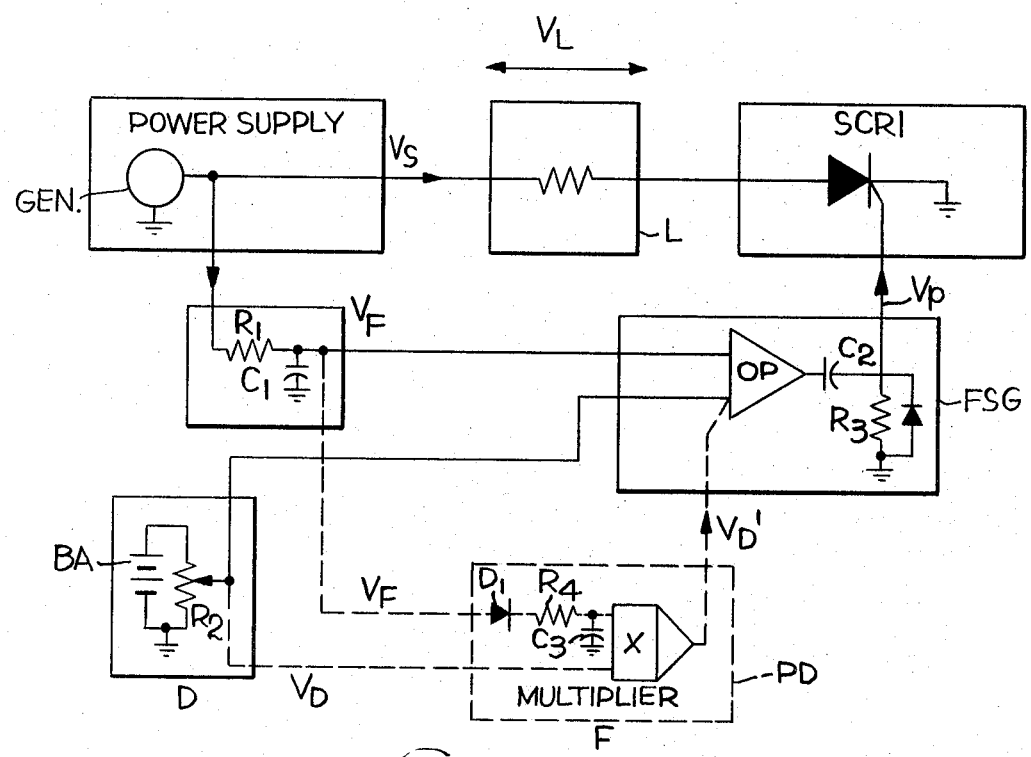

The firing pulses $V_P$ may be derived in firing signal generator FSG by comparing the filter output signal $V_F$ with a unidirectional reference signal $V_D$ whose magnitude is selectively variable and is related to the desired average voltage to be supplied to the load. The D.C. reference signal $V_D$ may be derived at the sliding contact of an output setting potentiometer D having a D.C. source such as a battery BA connected across its terminals as schematically illustrated in FIG. 3. Firing signal generator FSG compares the D.C. reference signal $V_D$ with the phase-shifted sinusoidal filter output voltage $V_F$ to derive spike firing pulses $V_P$. FIG. 3 schematically illustrates that firing signal generator FSG comprises a high gain operational amplifier OP which receives the two signals $V_F$ and $V_D$ on its inputs and a differentiating circuit coupled to the amplifier output comprising a series capacitor C2 and a resistance R3 having one side connected to ground. A diode D2 may be connected in shunt to resistance R3.

FIG. 2a illustrates the filter output voltage $V_F$ and its inversion $-V_F$ and shows that firing signal generator FSG derives the firing pulses $V_P$ when the two signals $V_D$ and $-V_F$ cross. The output voltage $V_0$ of operational amplifier OP will be held negative as long as the sum of the filter output voltage $V_F$ and the reference signal $V_D$ is negative. When the magnitude of positive-going voltage $V_F$ (which is instantaneously negative in polarity) becomes less than the magnitude of positive reference signal $V_D$, their sum becomes positive, and the output $V_O$ of operational amplifier OP will be flipped positive. FIG. 2a illustrates that this transition occurs when inversion $-V_F$ falls below $V_D$. The change in polarity of the amplifier output from negative to positive generates a positive-going firing pulse $V_P$ which is coupled to the gate of SCR1 and turns it on so that it conducts during the remainder of the positive half cycle of generator voltage $V_S$ shown in hatched lines in FIG. 2a which represents the condition wherein the supply voltage amplitude and frequency are normal.

When negative-going phase-shifted filter output voltage $V_F$ becomes more negative than the magnitude of positive reference voltage $V_D$, (i.e., where $-V_F$ becomes greater than $V_D$), the output $V_0$ of amplifier OP is flipped negative, and differentiating circuit C2-R3 generates a negative spike pulse which is clipped by diode D2 so that rectifier SCR1 does not see the negative pulse at its gate.

If the frequency of generator voltage $V_S$ changes so that the filter output voltage shifts in phase to $V_{F1}$ as shown in dotted lines in FIG. 2b, it will be apparent that, even though the output setting reference signal $V_D$ is the same, signals $V_D$ and $-V_{F1}$ cross subsequent to the crossing of $-V_F$ and $V_D$ and generate firing signals $V_{P1}$ with a later firing angle than firing signals $V_P$ and which result in the average load voltage $V_{L1}$ being less than the normal load voltage $V_L$ by the hatched area $e_{VL1}$ shown in FIG. 2b. Similarly if supply voltage frequency or amplitude variations shift the amplitude (with normal phase) of the filter output voltage to $V_{F2}$ shown in dotted lines in FIG. 2c, it will be apparent that signals $V_D$ and $-V_{F2}$ cross prior to the crossing of $-V_F$ and $V_D$ and generate firing signals $V_{P2}$ having an earlier firing angle than firing signals $V_P$ and which result in the average load voltage $V_{L2}$ being greater than the normal load voltage by the hatched area $e_{VL2}$ shown in FIG. 2c.

In accordance with the invention, filter F is designed so that the phase shift -arctan $\omega R_1 C_1$ remains very large over the range of possible supply frequency variations to assure that the phase shift between $V_S$ and $V_F$ is equal to approximately 90°, (or $n$ times 90°, where $n$ is an integer) over the frequency range. In FIG. 3 filter F is shown as having a single stage $R_1$-$C_1$ which shifts the filter output voltage $V_F$ approximately 90° lagging in phase relative to the supply voltage $V_S$. Such 90° phase shift can provide control of the firing angle of the firing pulses $V_P$ over the entire 180° of the positive half cycle of generator voltage $V_S$, although in the schematic FIG. 3 embodiment wherein the reference signal $V_D$ is always positive only 90° of this range is utilized.

In a filter with large $\omega R_1 C_1$, the amplitude of the filter output signal $V_F$ varies widely with frequency since the amplitude transfer function of the filter can be approximated by:

$$V_F/V_S = 1/\omega R_1 C_1$$

The filter output voltage $V_F$, having approximately constant 90° phase shift but large amplitude variation, is fed to a proportionality device PD which varies the reference signal $V_D$ in proportion to the amplitude of the filter output voltage $V_F$. Proportionality device PD includes a rectifier $D_1$ in which voltage $V_F$ is rectified and a smoothing filter R4-C3 which removes ripples from the rectified signal and derives a D.C. voltage across capacitor C3 proportional to the magnitude of voltage $V_F$. The D.C. voltage across capacitor C3 is applied to one input of an analog multiplier X which may be of the differential input type commercially available from Burr-Brown Research Corporation. The D.C. reference signal $V_D$ is applied to the other input of multiplier X. The output $V_D'$ of multiplier X is the algebraic product of $V_D$ and $V_F$ modified by an appropriate scale factor by multiplier X and is applied to one input of high gain operational amplifier OP of the firing signal generator FSG. Multiplier X makes the output setting reference signal $V_D$ vary in proportion to the amplitude of the filter output signal $V_F$ and thus eliminates the need for regulating the amplitude of the filter output signal. Stated in another way, multiplier X controls the ratio of phase-shifted sample generator voltage $V_F$ to reference voltage $V_D$ and thus makes the phase-control angles of firing pulses $V_P$ independent of amplitude variations of $V_F$ resulting from changes in supply voltage frequency or amplitude.

High gain operational amplifier OP of the firing signal generator FSG flips its output $V_O$ from negative to positive when the sum of phase-shifted sample generator voltage $V_F$ and the reference voltage $V_D$ becomes positive (where $V_D$ and $-V_F$ cross). FIG. 2c represents that the amplitude of filter output voltage may decrease to $V_{F2}$ as a result of supply voltage frequency variation and (in the absence of multiplier X) would result in firing pulses $V_{P2}$ being generated (when $V_D$ and $-V_{F2}$ cross) with earlier firing angles than desired and consequently a greater load voltage $V_{L2}$ than desired. Since the amplitude of the filter output voltage has decreased to $V_{F2}$, analog multiplier X multiplies reference signal $V_D$ in proportion to the amplitude of signal $V_{F2}$ to derive signal $V_D'$ as an input to operational amplifier OP. The amplifier OP changes polarity of output when negative-going inversion signal $-V_{F2}$ and modified reference signal $V_D'$ cross as shown in FIG. 2c and thus causes the differentiator C2-R3 to generate the SCR firing signal $V_P$ at the desired, or normal firing angle independent of frequency and amplitude variations in supply voltage $V_S$. Multiplier X makes signal $V_D' = kV_F$, where $k$ is a constant determined by the setting of output controlling potentiometer R2.

Normally firing signal generator FSG compares $V_F$ and $V_D$ and generates a firing pulse $V_P$ when reference signal $V_D = V_F \cos\omega t$. This equation may be written $V_D = V_F \cos A$, where $A = \omega t$ is a phase angle on the $V_S$ waveform. The phase angle A determines the firing angle of firing pulse $V_P$ with respect to the supply voltage $V_S$ waveform and regulates the load voltage $V_L$. This equation may be rewritten:

$$A = \cos^{-1}(V_D/V_F)$$

where, as the reference voltage $V_D$ varies from $+V_F$ to $-V_F$, the (firing) angle A varies from 0° to 180°, and the position of firing pulse $V_P$ (i.e. firing angle) moves from the beginning to the end of the positive half cycle of supply voltage $V_S$ and thereby causes the load voltage to vary from maximum to 0. In the sample FIG. 3 embodiment, $V_F$ is always of one polarity so that only 90° of range is available for A, and the output voltage range is similarly limited.

If an error e occurs in the phase of the filter output voltage, the firing angle where $V_P$ is generated is determined by the equation $V_F$ cosine $(A + e) = V_D$. Then for a given ratio of $V_D/V_F$, the firing angle $A = \cos^{-1}((V_D/V_F) - e)$ and causes the firing pulse $V_P$ to shift from its correct firing angle.

If supply frequency change varies the amplitude of filter output voltage from $V_F$ to $V_{F1}$, the result (without multiplier X) is to distort the ratio $V_D/V_F$ to $V_D/V_{F1}$. Multiplier X makes $V_D'$ equal to $kV_F$, where $k$ is a constant determined by the setting of potentiometer R2. Inasmuch as firing signal generator FSG utilizes $V_D'$ instead of reference signal $V_D$, the equation for the firing angle for the firing pulse becomes $$A = \cos^{-1}k(V_F/V_F) \text{ or } A = \cos^{-1}k$$

Since the term $V_F$ no longer appears in numerator or denominator, it will be apparent that the firing angles of the SCR firing pulses are independent of variations in amplitude of filter output voltage $V_F$.

Figure 4:
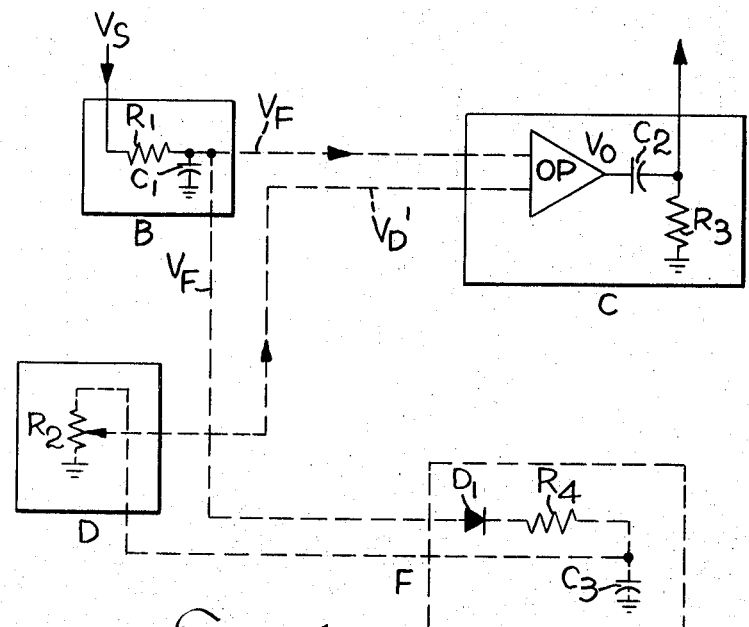
FIG. 4 shows an alternative form of a portion of the FIG. 3 circuit diagram.

FIG. 4 illustrates an alternative embodiment which eliminates the multiplier X of proportionality device PD and also the battery BA of the outpout setting control D. The D.C. voltage (proportional to filter output voltage amplitude) developed across capacitor C3 is applied across potentiometer R2 of output setting control D, and the signal $V_D'$ is derived at the slidable contact of potentiometer R2 and coupled to the inverting input of operational amplifier OP, thereby also making $V_D' = kV_F$ and providing the same result as the FIG. 3 embodiment.

Figure 5:
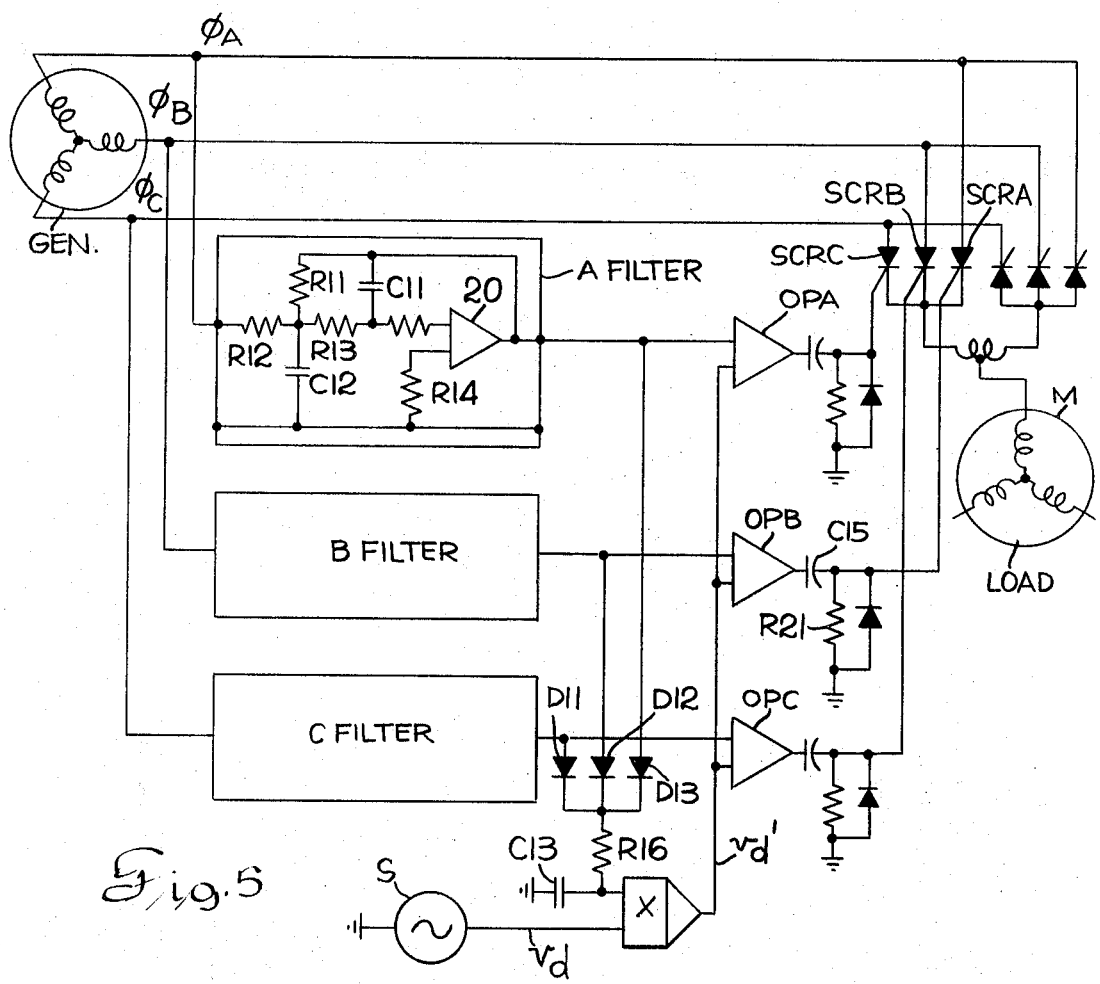
FIG. 5 is a schematic block diagram of a polyphase power rectifier with phase control embodying the invention.

FIG. 5 is a schematic block diagram of a three phase rectifier circuit with phase control embodying the invention. The rectifier is represented as a cycloconverter energizing a three phase load shown as a motor M, and only one thyristor set of the cycloconverter comprising a positive group of thyristors SCRA, SCRB, SCRC and a negative group of thyristors is shown which groups are connected back to back and energize one phase winding of motor load M. A three phase alternating current power supply such as a generator GEN generates three phase voltages $\phi_A$, $\phi_B$, $\phi_C$ shown in FIG. 6 which are respectively applied to the anodes of the positive group thyristors SCRA, SCRB, SCRC and also to the cathodes of the negative group thyristors.

Samples of the three sinusoidal generator voltages $\phi_A$, $\phi_B$, $\phi_C$ are passed through respective filters which shift them through a substantially constant phase angle of approximately 180° but provide wide amplitude variation. Only the circuit for the phase A filter is schematically illustrated and includes resistors R11, R12, R13 and R14, two capacitors C11 and C12, and an operational amplifier 20. The outputs of the three phase filters are rectified by respective diodes D11, D12, D13, and the rectified signals are fed to a smoothing filter R16, C13 which develops a D.C. signal proportional to the average amplitude of the filter output voltages, i.e., of the phase-shifted sample generator voltages. The D.C. signal developed across capacitor C13 is applied to one input of analog multiplier X.

An alternating current reference signal $v_d$ of low frequency relative to that of supply generator GEN and which it is desired to apply to motor load M is derived in a suitable signal source S and applied to the other input to analog multiplier X. Multiplier X thus varies the magnitude of reference signal $v_d$ in proportion to the average amplitude of the output signals from the three phase filters.

The phase-shifted sample generator voltage outputs (only one of which $-\phi_B$ being shown) from the phase filters are applied to the inverting inputs of respective operational amplifiers OPA, OPB, and OPC, and the modified reference signal output $v_d'$ from analog multiplier X is applied to the non-inverting inputs of the three amplifiers. A differentiating circuit is coupled to the output of each operational amplifier OPA, OPB, OPC so that a spike firing pulse is generated when the output of the amplifier is flipped to the opposite polarity in a manner analogous to the embodiment of FIG. 3. Each operational amplifier OPA, OPB, OPC compares the phase-shifted sample generator voltage input thereto with the modified reference signal $v_d'$ input and causes the associated differentiating signal to derive a SCR firing pulse when the two inputs are equal. Inasmuch as the sample generator voltages have been shifted 180° in the phase filters, each 180° phase-shifted signal may control the derivation of firing pulses for one of the three positive group thyristors SCRA, SCRB, or SCRC. For example, operational amplifier OPB receives as inputs the modified reference signal $v_d'$ output from analog amplifier X and the 180° phase-shifted sample generator voltage $-\phi_B$ from the phase B filter and compares them. The output of operational amplifier OPB is coupled to differentiating circuit C15, R21, and the voltage developed across capacitor C15 is applied to the gate of positive group thyristor SCRA. It will be noted that amplifier OPB receives sample generator phase voltage $-\phi_B$ but that the associated differentiator C15, R21 is coupled to the gate of SCRA whose anode receives the $\phi_A$ generator voltage.

Figure 6:
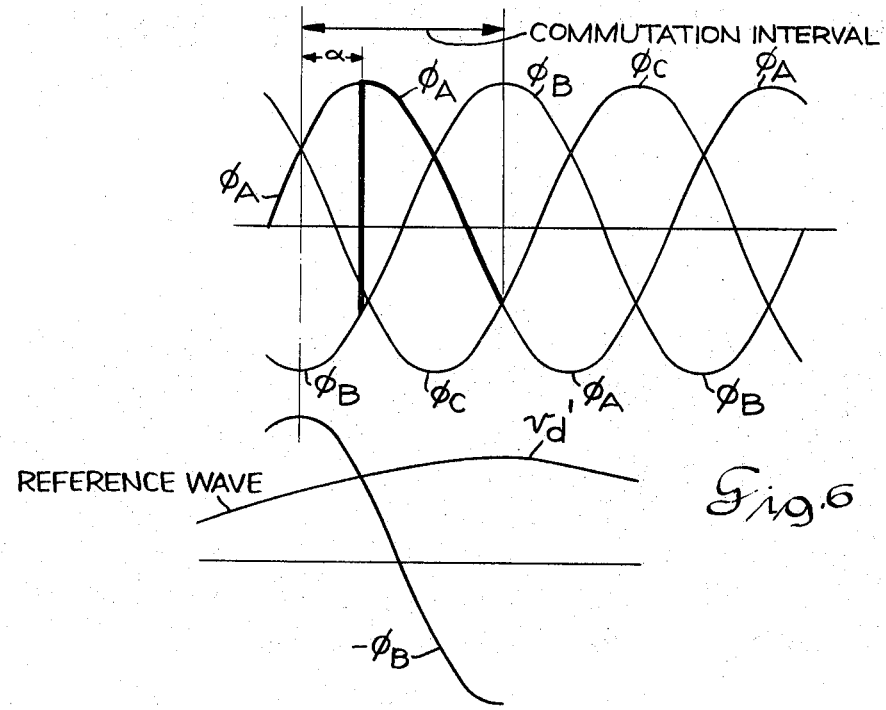
FIG. 6 illustrates the sample generator phase voltages and the reference voltage in the embodiment of FIG. 5.

FIG. 6 illustrates the three generator phase voltages $\phi_A$, $\phi_B$, $\phi_C$ and also represents the 180° phase-shifted sample generator voltage $-\phi_B$ which is the inverse of phase voltage $\phi_B$. At the point where phase-shifted sample generator voltage $-\phi_B$ crosses the modified reference signal $v_d'$, the polarity of amplifier OPB flips from negative to positive and causes differentiator C15-R21 to generate a positive firing pulse which is coupled to the gate of positive group thyristor SCRA and turns it on. FIG. 6 shows in bold lines the portion of generator phase voltage $\phi_A$ wave during which thyristor SCRA may conduct before being turned off by natural commutation, and it will be appreciated that the phase-shifted sample generator voltage $-\phi_B$ can control the firing delay angle $\alpha$ over the entire 180° available commutation interval. Multiplier X makes the reference signal $v_d'$ vary in proportion to the average amplitude of the phase-shifted sample generator voltages and thus eliminates the need for regulating the amplitude of the phase-shifted sample generator voltages.

In repetition, analog multiplier X controls the ratio of phase-shifted sample generator voltages (such as $\phi_B$) to reference signal $v_d'$ and thus makes the phase control angles of the SCR firing pulses independent of supply voltage frequency or voltage variations. Aforementioned U.S. Pat. No. 3,584,276 discloses a cycloconverter analogous to that schematically represented in the block diagram of FIG. 5.

While only a few embodiments of the invention have been illustrated and described, it should be understood that we do not intend to be limited to such embodiments for many modifications and variations thereof will be obvious to those skilled in the art.

The embodiments of the invention in which an exclusive property or privilege is claimed are defined as follows:

1. In a phase control rectifier circuit wherein a sample of the power supply voltage is compared with a reference signal to derive firing pulses for a load-supplying controlled rectifier, the improvement comprising
   a filter for shifting the sample voltage through a substantially constant phase angle of approximately $n$ times 90°, where $n$ is an integer,
   means for deriving a D.C. signal proportional to the amplitude of the phase-shifted filter output voltage, and
   means for varying the magnitude of said reference signal in accordance with said D.C. signal, whereby the firing angles of rectifier firing pulses generated by comparing the output of said last-named means with the phase-shifted filter output signal are independent of variations in supply voltage frequency and magnitude.

2. In a phase control rectifier circuit in accordance with claim 1 wherein said means for varying the magnitude of said reference signal includes an analog multiplier receiving said D.C. signal and said reference signal as inputs.

3. In a phase control rectifier circuit in accordance with claim 2 and including high gain operational amplifier means for deriving said firing pulses and receiving as inputs the phase-shifted output voltage from said filter and the output of said analog multiplier and also including a differentiating circuit.

4. In the method of deriving firing pulses for a phase control rectifier circuit by comparing a sample of the power supply voltage with a reference signal, the improvement comprising the steps of
   passing said sample voltage through a filter which introduces a phase shift of approximately $n$ times 90°, where $n$ is an integer,
   varying the magnitude of said reference signal in accordance with the amplitude of the phase-shifted filter output voltage, and
   comparing the signal generated in said last-named step with the phase-shifted filter output voltage to derive said firing pulses, whereby the delay angles of said firing pulses are independent of frequency and amplitude variations in the power supply voltage.

5. A circuit for providing firing signals for a load-supplying phase control rectifier, comprising, in combination,
   means for providing a sample of the power supply voltage, a filter for shifting said sample voltage through a substantially constant phase angle of approximately *n* times 90°, where *n* is an integer, means for deriving a D. C. signal proportional to the amplitude of the phase-shifted filter output voltage, output setting means for generating a reference signal representative of the desired voltage to be supplied to the load, means for varying the magnitude of said reference signal in accordance with said D.C. signal, and means for comparing the output of said last-named means with said phase-shifted filter output voltage to derive firing signals for said rectifier, whereby the delay angle of said firing signals are independent of variations in supply voltage frequency and amplitude.

6. A circuit in accordance with claim 5 wherein said means for varying the magnitude of said reference signal includes an analog multiplier receiving said reference signal and said D.C. signal as inputs and having its output coupled to said firing signal deriving means.

7. A circuit in accordance with claim 5 wherein said output setting means includes a potentiometer and said means for varying the magnitude of said reference signal applies said D.C. signal across said potentiometer, the slidable contact of said potentiometer being coupled to said firing signal deriving means.

8. A circuit in accordance with claim 6 wherein said firing signal deriving means includes a high gain operational amplifier receiving said phase-shifted filter output voltage and the multiplier output voltage as inputs and having its output coupled to a differentiating circuit.

9. A circuit in accordance with claim 8 wherein said means for deriving a D.C. signal includes a rectifier coupled to the output of said filter and an R-C ripple-removing filter in series with said rectifier.

10. A circuit for deriving firing signals for a load-supplying phase control rectifier whose firing angles are independent of variations in frequency and amplitude of the power supply comprising, comparing means receiving two input signals for generating firing signals for said rectifier when the two input signals are equal in magnitude, means for deriving a sample of the power supply voltage, a filter for shifting said sample voltage through a substantially constant phase angle of approximately *n* times 90°, where *n* is an integer, means for deriving a reference signal representative of the desired voltage to be supplied to said load, means for deriving a D.C. signal proportional to the amplitude of the phase-shifted filter output voltage, and means for multiplying said reference signal and said D.C. signal, said phase-shifted output voltage from said filter and the output signal from said multiplying means being the inputs to said firing signal generating means.

11. A circuit in accordance with claim 10 wherein said firing signal generating means includes an operational amplifier receiving said phase-shifted filter output voltage and the output of said multiplying means on its inputs and having a differentiator coupled to its output.

12. In a load-supplying polyphase rectifier utilizing phase control wherein samples of the power supply phase voltages are compared with a reference signal to generate firing signals for the phase rectifiers, means for deriving samples of the power supply phase voltages, a filter for each sample supply phase voltage adapted to shift it through a substantially constant phase angle of approximately 180°, means for deriving a D.C. signal which is a function of the average amplitude of the phase-shifted output voltages from said filters, means for providing a reference signal representative of the desired voltage to be supplied to the load, means for varying the magnitude of said reference signal in proportion to said D.C. signal; and a plurality of firing signal deriving means for comparing the modified reference signal output from said lastnamed means with the phase-shifted output of one of said filters to generate firing signals for a phase rectifier receiving a power supply voltage of a phase different than that of the sample supply voltage input to said filter.

13. In a polyphase rectifier with phase control wherein controlled rectifiers receiving respective power supply phase voltages are gated on by firing signals having selectively variable firing delay angles to regulate the voltage supplied to a load, means to derive a sample of each power supply phase voltage, a filter for each said sample voltage adapted to shift it through a substantially constant phase angle of approximately 180°, means for deriving a D.C. signal proportional to the average amplitude of the output voltages from said filters, a signal source for deriving a reference voltage representative of the voltage desired to be supplied to said load, means for multiplying said reference signal in accordance with said D.C. signal to derive an amplitude-modulated reference signal; and a plurality of firing signal generating means each of which compares one of said phase-shifted sample power supply voltages with said amplitude-modulated reference signal to generate firing pulses for one of said controlled rectifiers, each said firing signal generating means deriving firing pulses for a controlled rectifier which receives a power supply phase voltage of a phase different that the phase of the sample voltage input thereto.

14. The combination of claim 13 wherein said polyphase rectifier is a cycloconverter having a positive group and a negative group of controlled rectifiers coupled to each phase of the power supply.

* * * * *